Patented Aug. 16, 1927.

1,639,571

UNITED STATES PATENT OFFICE.

HERBERT LANGWELL, OF EPSOM, ENGLAND.

FERMENTATION OF CELLULOSE.

No Drawing. Application filed January 7, 1921, Serial No. 435,734, and in Great Britain January 8, 1920.

This invention relates to the manufacture of products obtained by the direct fermentation of cellulose and is an improvement of the process described in the specification of my United States Patent No. 1,443,881, dated 30th January, 1923.

In the specification of said patent, I have described and claimed a process for the direct fermentation of cellulose with the object of obtaining certain valuable products, such as acetic acid and other fatty acids, and organic compounds, characterized by the combination of certain conditions in carrying out said process.

One element of said combination is that the fermentation process should be carried out under aerobic conditions.

Further investigations have shown that when aeration is complete, that is to say, when aerobiosis occurs in the highest degree possible in the normal atmosphere, the fermentation is slow, and that the degree of aeration of the culture has a considerable effect, as a matter of fact, a greater effect on the course of the fermentation and the products obtained thereby than was at first anticipated.

I have now studied the conditions of aeration by varying the degree of aeration of the culture, and have examined the products obtained thereby.

I have found that when the aeration is highly limited acetic acid is the main useful product, so that the best yield of acetic acid may be obtained under such conditions of limited aeration.

On the other hand, I have found that as the aeration is increased, the lighter fatty alcohols, particularly ethyl alcohol, are produced, until under complete aerobiosis ethyl alcohol is the main useful product, although as already stated, the fermentation is slow under these conditions.

Thus the fermentation can be so controlled by suitable regulation of aeration, to produce the best yield of acetic acid as the main product or the best yield of alcohol as the main product, generally speaking the lower degree of aeration being the conditions for the best yield of acetic acid or the like, whereas, by suitably increasing the aeration the best yield of alcohol may be obtained.

I have further found that under suitable conditions another element of the combination of the conditions set forth in the specification of my Patent No. 1,443,881 for obtaining the best results of fermentation of cellulose, i. e., the addition of the more soluble and easily fermentable carbohydrates acting as a primer to the fermentation, may be dispensed with.

The present invention consists in carrying out the process of direct fermentation of cellulose, as set forth in the specification of my Patent No. 1,443,881, by regulating the degree of aeration of the culture with the object of influencing the products obtained thereby.

In carrying out the process, the conditions set forth in the specification of my aforesaid Patent No. 1,443,881 should be observed, and in case it is required to produce lighter aliphatic alcohols or ethyl alcohol, the aeration should be increased to such a degree that these alcohols are formed, which can be easily ascertained by examining samples of the mass under treatment at various stages of the process.

The alcohol formed should be removed from the culture as far as possible as soon as it is produced or at the rate at which it is produced, in other words, the concentration of the alcohol should be maintained in such a way that the fermentation is not adversely affected thereby. This may be effected for example by distillation in a partial vacuum at temperatures up to, for example, 60° C.

In carrying out the invention for the production of acetic acid or similar fatty acids, similar conditions to those set forth in the specification of my Patent No. 1,443,881 should be observed, and the aeration of the culture should be limited to such a degree that mainly acetic acid or other fatty acids are produced. The control of the aeration can be easily effected by examining samples of the mass under treatment at various stages of the process.

As previously stated, in either case, whether there be increased aeration or restricted aeration, the addition of priming substances, such as the more soluble and easily fermentable carbo-hydrates may be dispensed with.

What I claim as new and desire to secure by Letters Patent is:—

1. The process of obtaining alcohol which comprises preparing a mash of cellulose-containing material, inoculating said mash with an organism which is adapted to attack cellulose and thereby to produce ethyl alcohol and aliphatic acids, allowing said mash to ferment with aeration and increasing the degree of aeration above that at which mainly aliphatic acids are formed, until mainly ethyl alcohol is produced.

2. The process of obtaining alcohol which comprises preparing a mash of cellulose-containing material, inoculating said mash with an organism which is adapted to attack cellulose and thereby to produce ethyl alcohol and aliphatic acids, allowing said mash to ferment with aeration, increasing the degree of aeration above that at which mainly aliphatic acids are formed, in order to produce mainly ethyl alcohol, and maintaining the alcohol formed at a concentration not substantially interfering with the fermentation.

In testimony whereof, I affix my signature.

HERBERT LANGWELL.